US006152239A

United States Patent [19]

Kelley et al.

[11] Patent Number: 6,152,239

[45] Date of Patent: Nov. 28, 2000

[54] ERGONOMIC ELECTRONIC HAND CONTROL FOR A MOTOR GRADER

[75] Inventors: Craig B. Kelley, Dunlap; Daniel E. Shearer; Susan M. Boast, both of Metamora, all of Ill.

[73] Assignee: Caterpillar Inc., Peoria, Ill.

[21] Appl. No.: 09/237,166

[22] Filed: Jan. 25, 1999

[51] Int. Cl.[7] .......... B64C 13/04

[52] U.S. Cl. .......... 172/4.5; 74/493; 74/523; 180/333

[58] Field of Search .......... 172/4.5, 2; 701/50; 244/234; 74/523, 526, 493; 180/333; 200/61.88

[56] References Cited

U.S. PATENT DOCUMENTS

| | | | |
|---|---|---|---|
| 4,012,014 | 3/1977 | Marshall | 244/83 F |
| 4,350,055 | 9/1982 | Pinomaki | 74/471 |
| 4,641,723 | 2/1987 | Takanashi et al. | 180/315 |
| 4,738,417 | 4/1988 | Wenger | 244/234 |
| 4,795,296 | 1/1989 | Jau | 414/5 |
| 4,811,921 | 3/1989 | Whitaker et al. | 244/234 |
| 4,952,919 | 8/1990 | Nippoldt | 340/710 |
| 5,503,040 | 4/1996 | Wright | 74/471 XY |
| 5,566,586 | 10/1996 | Lauer et al. | 74/523 |
| 5,591,082 | 1/1997 | Jensen et al. | 463/38 |
| 5,768,974 | 6/1998 | Ikeda et al. | 92/71 |

*Primary Examiner*—Christopher J. Novosad
*Attorney, Agent, or Firm*—Howard & Howard

[57] ABSTRACT

An ergonomic hand control is disclosed. The hand control includes a joystick that is moveable along a plurality of axes and movement of the joystick along any of the axes transmits an electronic input signal to an electronic control computer for controlling a plurality of motor grader functions. A second end of the joystick includes a finger rest and a series of ledges that are separated from each other by a riser. Mounted on each ledge is a switch. Movement of the switches along any of a plurality of axes is used to control one of a number of motor grader functions through the electronic control computer. The design of the hand control permits an operator to properly position a hand on the hand control without requiring the operator to look at the hand control.

8 Claims, 4 Drawing Sheets

ERGONOMIC ELECTRONIC HAND CONTROL FOR A MOTOR GRADER

TECHNICAL FIELD

This invention relates generally to a motor grader and specifically to a motor grader that includes an ergonomic electronic hand control.

BACKGROUND ART

This invention relates generally to a motor grader that includes an ergonomic electronic hand control for controlling a plurality of functions of the motor grader from a single hand control. The electronic hand control includes features that enable an operator to rapidly and properly position a hand on the hand control without requiring the operator to look at the hand control.

Motor graders typically include many hand controls to perform functions such as positioning an implement or a blade in one of several orientations, articulating the frame of the grader, and adjusting other grader settings. In most graders these hand controls are spaced apart from each other. Current motor graders require numerous hand controls because typically each hand control is used to control only one or two functions. Often, the operator of the motor grader must steer the grader while using the hand controls to perform many other functions, such as for example, adjusting the blade tip, adjusting the blade angle relative to the frame, and adjusting the articulation of the grader frame. Performing all of these functions using the many hand controls while steering the vehicle with the steering wheel is difficult, inefficient, and fatiguing for the operator. The operator must frequently remove one or both hands from the steering wheel to operate the other controls. In addition, the operator must visually check to ensure that the proper hand control has been selected.

Thus, to reduce difficulty, increase efficiency, and reduce operator fatigue, it is desirable to provide an ergonomic hand control that permits an operator to rapidly and properly position a hand on the hand control without requiring a visual check of the hand control. Also it is desirable to provide such a hand control that enables an operator to control a plurality of functions from the same hand control.

DISCLOSURE OF THE INVENTION

The present invention provides an efficient and ergonomic hand control for a motor grader. The hand control permits the operator to rapidly position a hand in the proper orientation to control a plurality of functions from the single hand control without looking at the hand control.

In a first embodiment the hand control for a motor grader comprises an electro-hydraulic control system having an electronic control computer connected to a plurality of electro-hydraulic actuators, each of which is connected to at least one of a plurality of hydraulic valves. Each of the hydraulic valves is connected to a hydraulic actuator, a hydraulic cylinder, or a hydraulic motor. The hand control further comprises a joystick having a first end opposite a second end and moveable on a plurality of axes. The second end comprises a plurality of ledges each separated from each other by a riser. Each of the ledges includes a switch that is moveable on at least one of the plurality of axes. Movement of the switches on one of the axes transmits a plurality of electrical input signals to the electrical control computer. The electrical control computer transmits a control signal to one of the plurality of electro-hydraulic actuators in response to each of the electrical input signals.

In a most preferred embodiment, the hand control further comprises a finger rest adjacent one of the plurality of ledges and separated from the ledge by a riser.

Thus, the present invention permits an operator to rapidly orient a hand on an electronic hand control that is used to control motor grader functions without visually checking the hand control. In addition, the present invention permits the operator to control a plurality of functions from a single hand control.

BEST MODE FOR CARRYING OUT THE INVENTION

Figure 1:
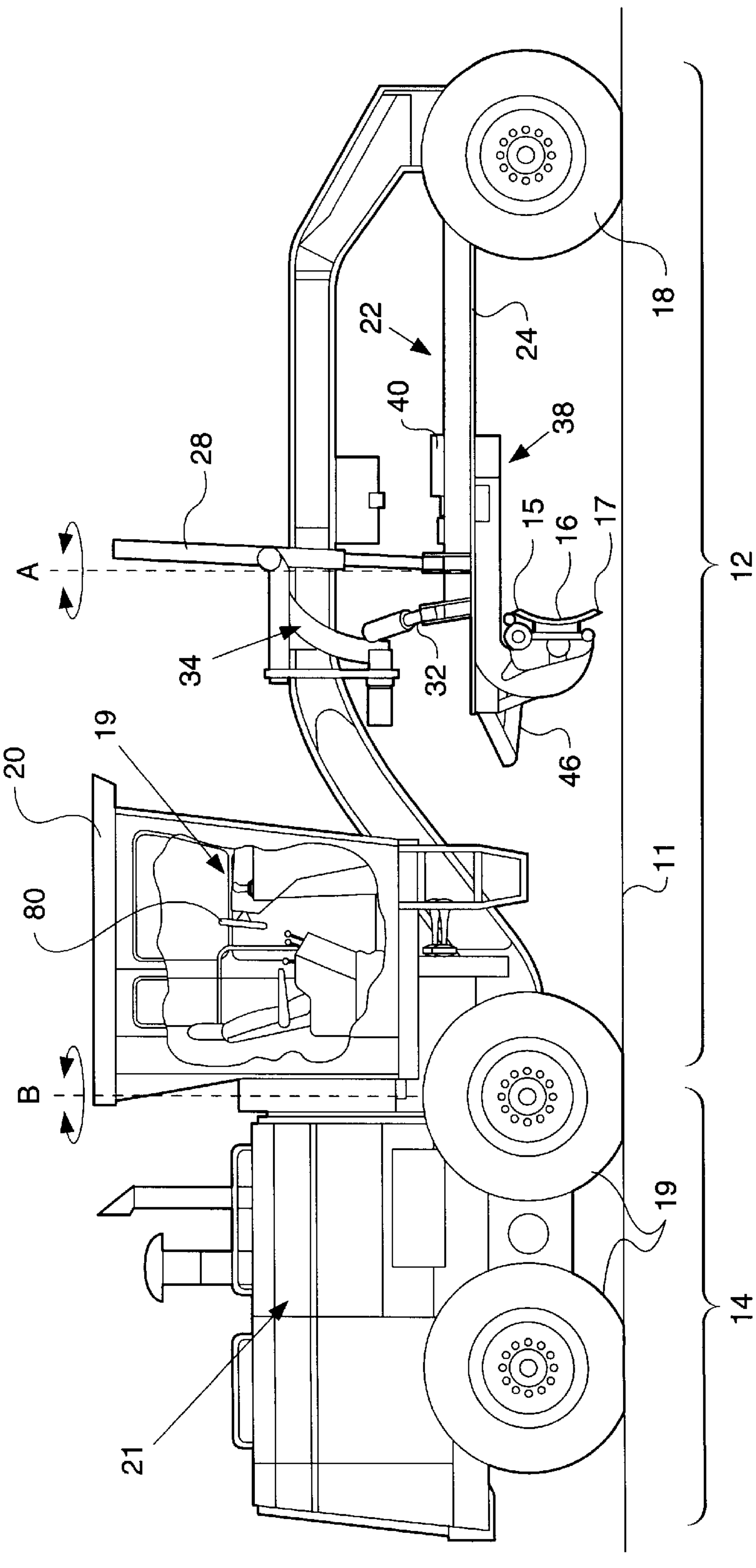
FIG. 1 is a side view of a motor grader.
Figure 2:
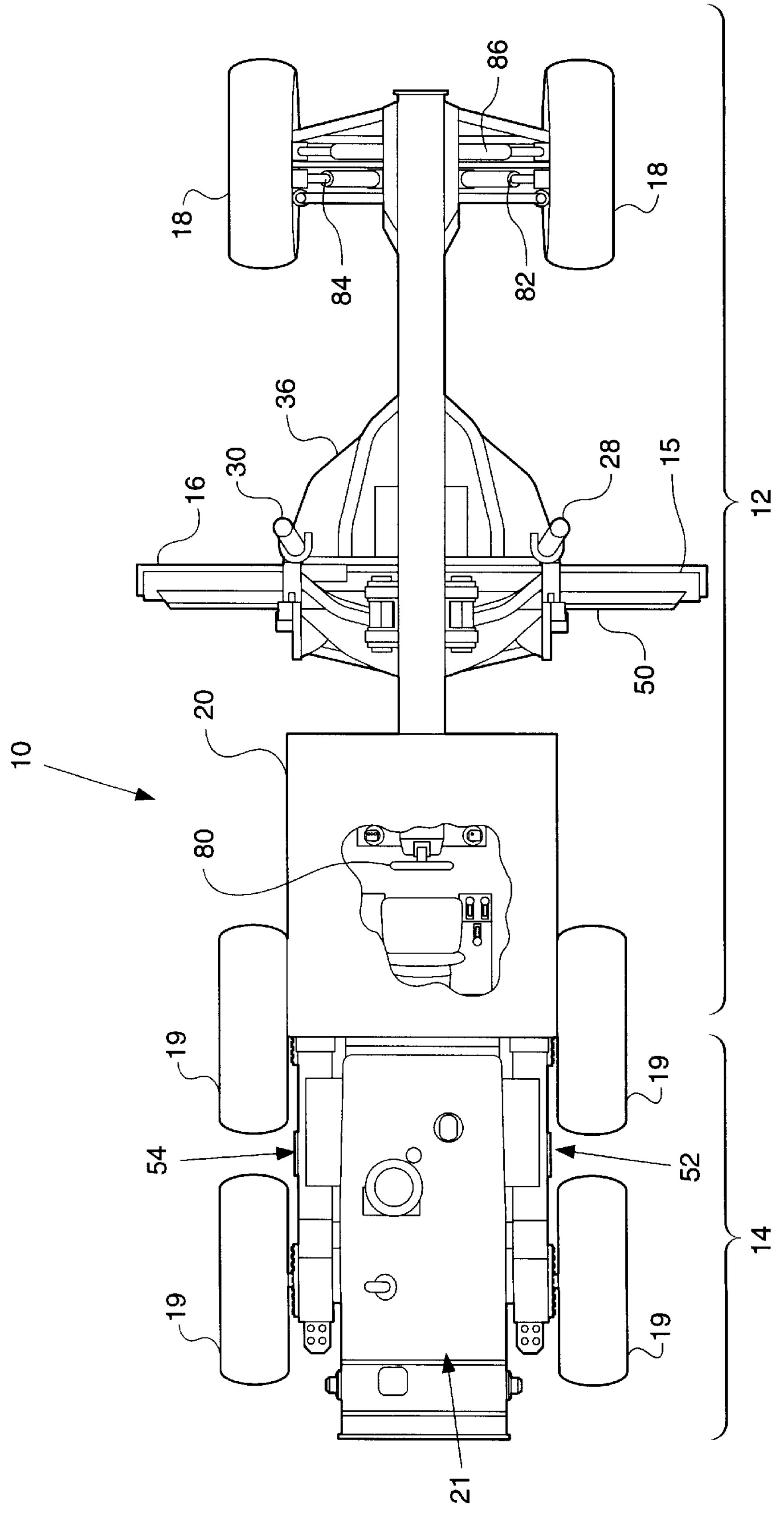
FIG. 2 is a top view of the motor grader.

Referring to the Figures, wherein like numerals indicate like or corresponding parts throughout the several views, a motor grader is shown generally at 10 in FIGS. 1 and 2. The motor grader 10 is used primarily as a finishing tool to sculpt a surface of earth 11 to a final arrangement. Rather than moving large quantities of earth in the direction of travel like other machines, such as a bulldozer, the motor grader 10 move relatively small quantities of earth from side to side.

The motor grader 10 includes a front frame 12, a rear frame 14, and a blade 16 having a top 15 and a cutting edge 17. The front and rear frames 12 and 14 are supported by front tires 18 and rear tires 19. An operator cab 20 containing the many controls including a steering wheel 80 and a plurality of electronic hand controls 90 (see FIG. 4) necessary to operate the motor grader 10 is mounted on the front frame 12. An engine, shown generally at 21, is used to drive or power the motor grader 10. The engine 21 is mounted on the rear frame 14. A standard transmission (not shown) enables the engine 21 to drive the motor grader 10 in a forward or a backward direction as is known in the art. The transmission includes a plurality of forward and reverse gears permitting the transmission to operate in a forward position, a neutral position, and a reverse position. Such tranmissions are known in the art. Thus, the transmission permits motor grader 10 to operate in a plurality of forward or reverse gears. The gears as well as the direction of travel can be selected using an electronic hand control 90 as described below.

The blade 16, sometimes referred to as a moldboard, is used to move earth. The blade 16 is mounted on a linkage assembly shown generally at 22. The linkage assembly 22 allows the blade 16 to be moved to a variety of different positions with respect to the motor grader 10. Starting at the front of the motor grader 10 and working rearward toward the blade 16, the linkage assembly 22 includes a drawbar 24.

The drawbar 24 is mounted to the front frame 12 with a ball joint. The position of the drawbar 24 is controlled by three hydraulic cylinders, commonly referred to as a right lift cylinder 28, a left lift cylinder 30, and a center shift cylinder 32. A coupling, shown generally at 34, connects the three cylinders 28, 30, and 32 to the front frame 12. The coupling 34 can be moved during blade repositioning but is fixed stationary during earthmoving operations. The height of the blade 16 with respect to the surface of earth 11 below the motor grader 10, commonly referred to as the blade height, is controlled primarily with the right lift cylinder 28 and the left lift cylinder 30. Each lift cylinder, 28 and 30, functions to raise and lower the associated end of the blade 16. Thus, the right lift cylinder 28 raises and lowers the right end of blade 16. The center shift cylinder 32 moves the drawbar 24 from side to side relative to the front frame 12.

The drawbar 24 includes a large, flat plate commonly referred to as a yoke plate 36, as shown in FIG. 2. Beneath the yoke plate 36 is a large gear, commonly referred to as a circle 38. The circle 38 is rotated by a hydraulic motor commonly referred to as a circle drive 40, as shown in FIG. 1. Rotation of the circle 38 by the circle drive 40 pivots the blade 16 about an axis A fixed to the drawbar 24. The blade 16 is mounted to a hinge (not shown) on the circle 38 with a bracket (not shown). A hydraulic blade tip cylinder 46 is used to pitch the bracket forward or rearward and thus pitch the top 15 of the blade 16 forward and rearward relative to the cutting edge 17. The blade 16 is mounted to a sliding joint in the bracket allowing the blade 16 to be slid or shifted from side to side with respect to the bracket. A hydraulic side shift cylinder 50, shown in FIG. 2, is used to control the side to side shift of the blade 16.

Referring now to FIG. 2, a right articulation cylinder, shown generally at 52, is mounted to the right side of the rear frame 14 and a left articulation cylinder, shown generally at 54, is mounted to the left side of the rear frame 14. The right and left articulation cylinders 52 and 54 are hydraulic and used to rotate the front frame 12 about an axis B shown in FIG. 1. The axis B is commonly referred to as the articulation axis. In FIG. 2, the motor grader 10 is positioned in a neutral or zero articulation angles. The rear tires 19 are driven by a differential (not shown) as is well known in the art.

Adjacent the front tires 18 are a hydraulic right steering cylinder 82 and a hydraulic left steering cylinder 84. The right steering cylinder 82 and the left steering cylinder 84 are used to control the rotation of front tires 18 and thus steer motor grader 10. In a conventional motor grader 10 rotation of the steering wheel 80 is used to actuate the right steering cylinder 82 and the left steering cylinder 84. In the present invention, electronic hand controls 90 acting through an electro-hydraulic control system 60 can also control steering as more fully described below.

A hydraulic wheel lean cylinder 86 adjusts a wheel lean angle of front tires 18. Wheel lean cylinder 86 adjusts the wheel lean of the right and left front tires 18 in synchrony. Wheel lean angle refers to the angle between a front tire 18 and a line extending perpendicularly upward from a flat surface of the earth 11. Wheel lean angle is used by operators to stabilize the motor grader 10 during turns, to enable sharper turns of motor grader 10, and to help counteract the side forces generated by the blade 16 scraping the surface of the earth 11. Generally, the front tires 18 are leaned in the direction that the blade 16 is casting the moved earth. A four-bar linkage, known in the art, permits the wheel lean of both front tires 18 to be controlled by a single wheel lean cylinder 86.

Figure 3:
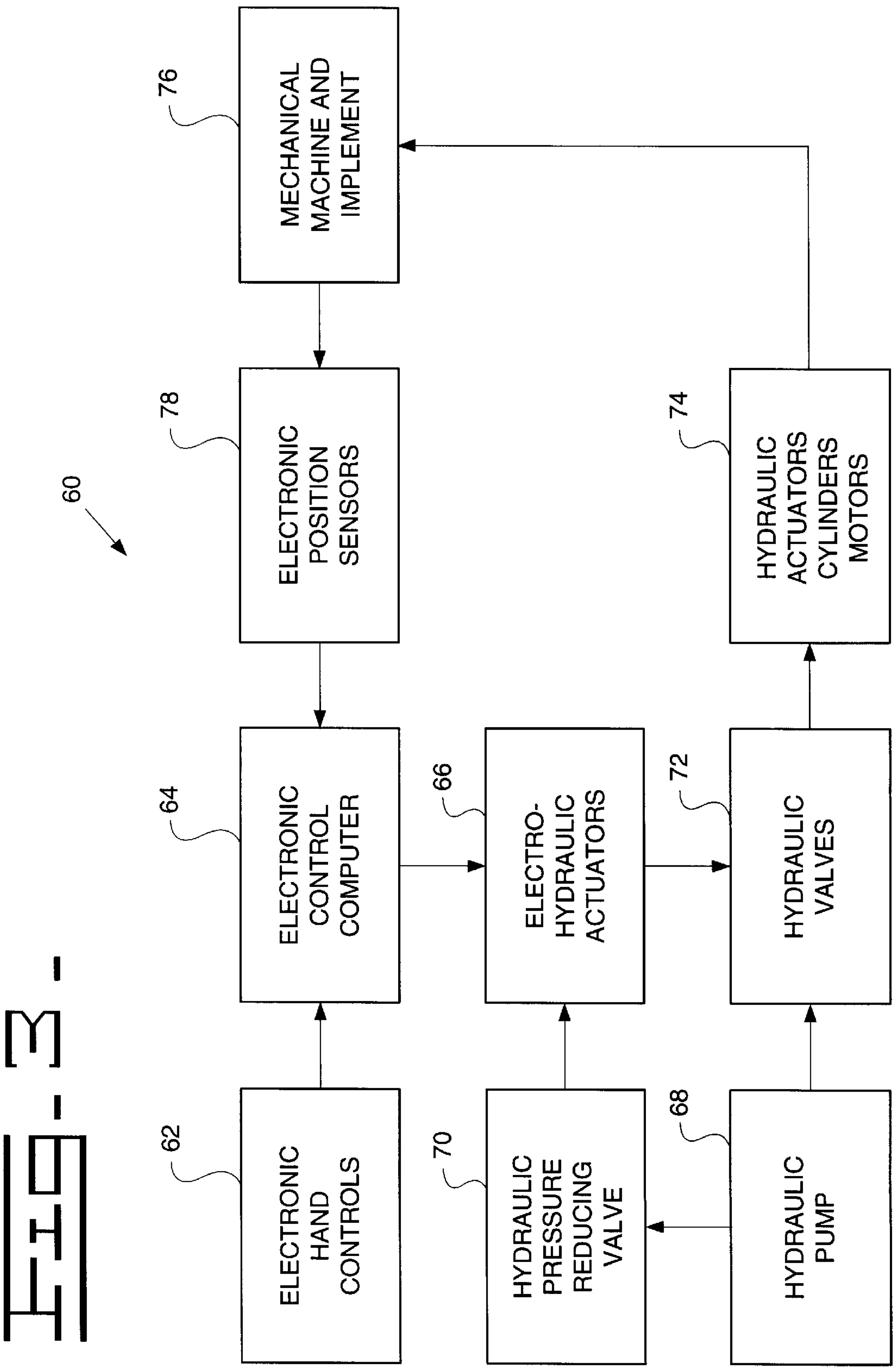
FIG. 3 is a schematic block diagram of an electro-hydraulic control system for the motor grader.

FIG. 3 is a schematic block diagram of an electro-hydraulic control system 60 for the motor grader 10. The control system 60 is designed to operate the various hydraulic controls of the motor grader 10 described above. The system 60 includes a plurality of electronic hand controls 90 (see FIG. 4) represented by block 62, which transform the actions of an operator's hands on the hand controls 90 into a plurality of electrical input signals. These input signals carry operational information to an electronic control computer, represented by block 64.

The control computer 64 receives the electrical input signals produced by the hand controls 62, processes the operational information carried by the input signals, and transmits control signals to a plurality of drive solenoids, each of which is located in an electro-hydraulic actuator, represented by block 66.

The hydraulic portion of the control system 60 requires both high hydraulic pressure and low pilot pressure. High hydraulic pressure is provided by a hydraulic pump, represented by block 68. The hydraulic pump 68 receives a rotary motion, typically from the engine 21 of the motor grader 10, and produces high hydraulic pressure. Low pilot pressure is provided by a hydraulic pressure-reducing valve, represented by block 70. The hydraulic pressure-reducing valve 70 receives high hydraulic pressure from the hydraulic pump 68 and supplies low pilot pressure to the electro-hydraulic actuators 66.

Each electro-hydraulic actuator 66 includes an electrical drive solenoid and a hydraulic valve. The solenoid receives control signals from the electronic control computer 64 and produces a controlled mechanical movement of a core stem of the actuator 66. The hydraulic valve receives both the controlled mechanical movement of the core stem of the actuator 66 and low pilot pressure from the hydraulic pressure reducing valve 70 and produces controlled pilot hydraulic pressure for hydraulic valves, represented by block 72.

The hydraulic valves 72 receive both controlled pilot hydraulic pressure from the electro-hydraulic actuators 66 and high hydraulic pressure from the hydraulic pump 68 and produce controlled high hydraulic pressure for hydraulic actuators, cylinders, and motors, represented by block 74.

The hydraulic actuators, cylinders, and motors 74 receive controlled high hydraulic pressure from the hydraulic valves 72 and produce mechanical force to move the front frame 12 of the grader 10 and several mechanical linkages, represented by block 76. As described above, movement of the front frame 12 of the grader 10 with respect to the rear frame 14 of the grader 10 establishes the articulation angle. Movement of the mechanical linkages 76 establishes the position of the blade 16 or other implements.

Each hydraulic actuator, cylinder, and motor 74, such as the lift cylinders 28 and 30 and the circle drive motor 40, includes an electronic position sensor, represented by block 78. The electronic position sensors 78 transmit information regarding the position of its respective hydraulic actuator, cylinder, or motor 76 to the electronic control computer 64. In this manner, the control computer 64 can, for example, determine the articulation angle of the grader 10 and position the blade 16. With such information, the control computer 64 can perform additional operations.

Figure 4:
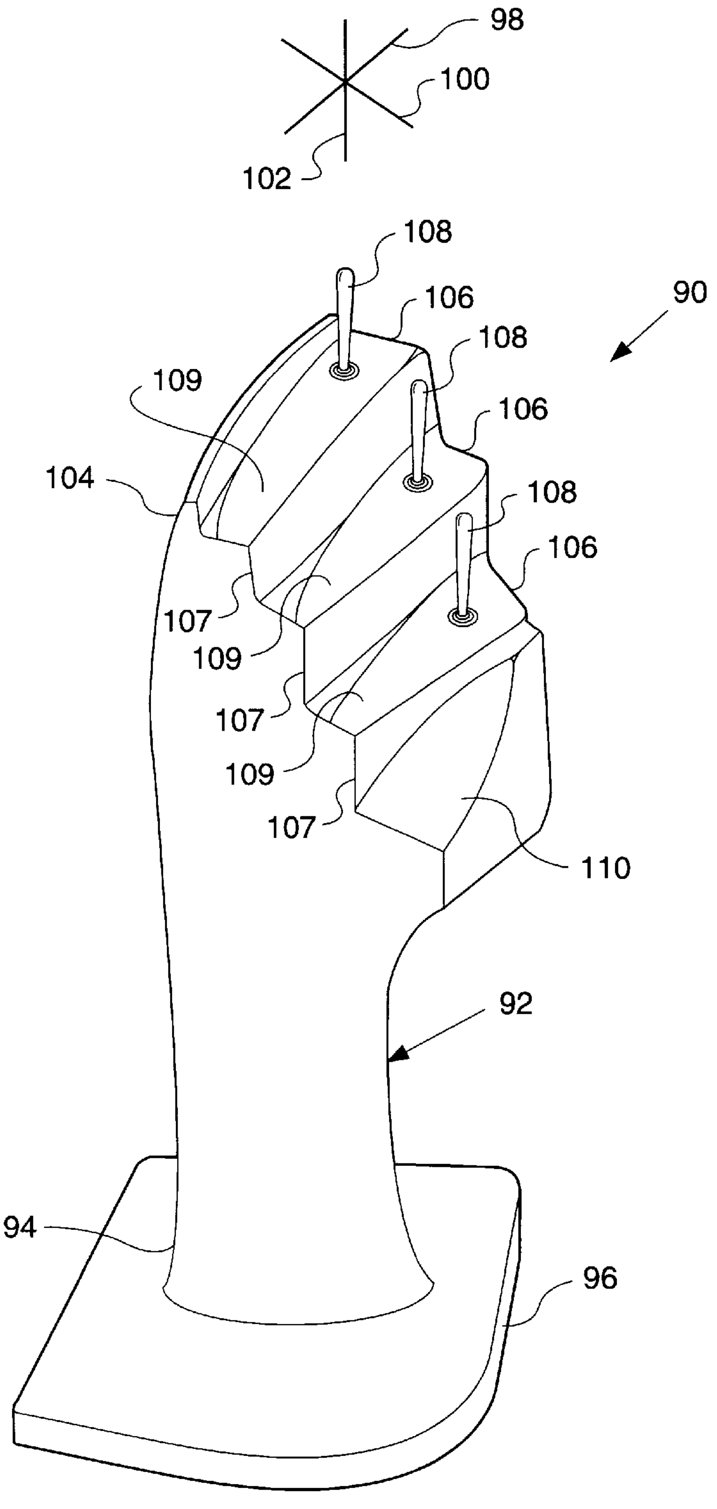
FIG. 4 is a side perspective of an electronic hand control designed in accordance with the present invention.

In FIG. 4 an electronic hand control is generally shown at 90. Hand control 90 comprises a joystick 92. Joystick 92 includes a first end 94 mounted to a base 96. Joystick 92 is movable along a first axis 98 and a second axis 100, which is generally perpendicular to the first axis 98. Joystick 92 is rotatable about a third axis 102 that is perpendicular to both first axis 98 and second axis 100. In this specification and the accompanying claims the phrase movable on an axis encompasses both linear movement of joystick 92 on either the first axis 98 or the second axis 100 and rotation of joystick 92 about third axis 102. Joystick 92 is also moveable along axes between the first axis 98 and the second axis 100.

Joystick 92 includes a second end 104 opposite first end 94. Second end 104 includes a series of ledges 106 each of which is separated from the others by a riser 107. Preferably, the ledges 106 and risers 107 form a miniature staircase structure as shown in FIG. 4. A switch 108 is mounted on each ledge 106. Each ledge 106 preferably includes a textured pad 109. Second end 104 also includes a finger rest 110 separated from one of ledges 106 by a riser 107. As would be understood by one of ordinary skill, finger rest 110 may also include a switch 108. The ledges 106 and risers 107 form convenient locators for the operator's fingers allowing rapid non-visual location. They also provide an ergonomically comfortable location for the operator's fingers.

Switches 108 may comprise momentary or toggle switches or rocker switches depending on their function. Switches 108 are moveable along first axis 98, second axis 100 or both first axis 98 and second axis 100 depending on their construction. Movement of switches 108 on either first axis 98 or second axis 100 transmits a plurality of electronic input signals to electronic control computer 64. Electronic control computer 64 transmits an output signal in response to each input signal to one of the electro-hydraulic actuators 66 to cause actuation of a hydraulic valve 72 for control of mechanical linkages 76.

By way of example, one of switches 108 comprises a momentary toggle switch moveable along first axis 98. Movement of switch 108 in a first direction on first axis 98 transmits an electronic input signal to electronic control computer 64. Electronic control computer 64 transmits a first control signal to one of the electro-hydraulic actuators 66 to cause transmission to shift up to a higher gear. Movement of switch 108 in a second direction, opposite first direction, on first axis 98 causes the transmission to shift down to a lower gear.

By way of example, one of switches 108 controls wheel lean cylinder 86 through electro-hydraulic control system 60. Movement of switch 108 in a first direction along second axis 100 increases the wheel lean angle of front tires 18 as long as switch 108 is moved in the first direction. Movement of switch 108 in a second direction, opposite first direction, on second axis 100 decreases wheel lean angle as long as switch 108 is moved in the second direction.

By way of example, one of switches 108 comprises a three-position switch that controls the direction of travel of motor grader 10 through electro-hydraulic control system 60. Movement of switch 108 to a first position sends an electrical input signal to electronic control computer 64, which sends a first control signal to an electro-hydraulic actuator 66 to shift transmission into a forward direction or position. Movement of switch 108 to a second position sends a second control signal and shifts transmission into the neutral position. Movement of switch 108 to a third position sends a third control signal and shifts transmission to a reverse position.

As described above, joystick 92 is movable along the first axis 98, the second axis 100, or the third axis 102. Movement of joystick 92 along any of the axes transmits electrical input signals to the electronic control computer 64. The electronic control computer 64 then transmits a control signal to at least one of the electro-hydraulic actuators 66 in response to each input signal. As described above, actuating one of the electro-hydraulic actuators 66 actuates either a hydraulic cylinder, a hydraulic motor, or a hydraulic actuator 74.

By way of example, movement of joystick 92 in a first direction on first axis 98 sends an electronic input signal to electronic control computer 64 to actuate either the left lift cylinder 30 or the right lift cylinder 28. Thus, movement of joystick in a first direction on axis 98 lowers the left or right side of blade 16, and movement of joystick 92 in a second direction on first axis 98 raises the left or right side of blade 16. By way of example, movement of joystick 92 along axis 100 may be used to control actuation of the right steering cylinder 92 and the left steering cylinder 94. Thus, movement of joystick 92 in a first direction along second axis 100 rotates front wheels 18 in a first direction while movement of joystick 92 in a second direction on axis 100 rotates front wheels 18 in a second direction opposite the first direction. Thus, movement of joystick 92 on axis 100 can be used to control steering of motor grader 10. By way of example, rotation of joystick 92 about third axis 102 may be used to actuate circle drive 40, and thereby control the articulation angle of blade 16.

INDUSTRIAL APPLICABILITY

The present invention relates generally to an ergonomic electronic hand control 90 that can be used to control a plurality of functions of a motor grader 10 through an electro-hydraulic control system 60. Electronic hand control 90 includes a joystick 92 having a first end 94 and a second end 104. Joystick 92 is moveable along a plurality of axes and movement of joystick 92 on any of the axes generates electrical input signals that are used by the electro-hydraulic control system 60 to control a plurality of functions of motor grader 10. Second end 104 of joystick 92 includes a series of ledges 106 each of which is separated from each other by a riser 107. A switch 108 is mounted on each of ledges 106. Second end 104 preferably also includes a finger rest 110. Movement of switches 108 along one of a plurality of axes generates electrical input signals that are used by the electro-hydraulic control system 60 to control any of a plurality of motor grader 10 functions. Thus, the present invention provides an ergonomic electronic hand control 90 that permits an operator to properly position a hand on the hand control 90 without requiring the operator to look at the hand control 90.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

What is claimed is:

1. A hand control for a motor grader comprising:

an electro-hydraulic control system having an electronic control computer connected to a plurality of electro-hydraulic actuators, each of said plurality of electro-hydraulic actuators connected to at least one of a plurality of hydraulic valves and each of said plurality of hydraulic valves connected to one of a hydraulic actuator, a hydraulic cylinder, or a hydraulic motor;

a joystick having a first end opposite a second end and moveable on a plurality of axes;

said second end comprising a plurality of ledges each separated from each other by a riser; and each of said ledges including a switch movable on at least one of said plurality of axes, movement of each of said switches on said axes transmitting a plurality of electrical input signals to said electronic control computer, said electronic control computer transmitting a control signal to one of said plurality of electro-hydraulic actuators in response to each of said electrical input signals.

2. A hand control for a motor grader as recited in claim 1 wherein said second end further comprises a finger rest, said finger rest adjacent one of said plurality of ledges and separated from said ledge by a riser.

3. A hand control for a motor grader as recited in claim 1 further comprising a transmission having a plurality of gears, said transmission connected to one of said electro-hydraulic actuators and wherein movement of one of said switches in a first direction on one of said axes transmits a first control signal to said electro-hydraulic actuator connected to said transmission;

said transmission shifting up at least one gear in response to said first control signal; and movement of said switch in a second direction opposite said first direction on said axis transmitting a second control signal to said electro-hydraulic actuator connected to said transmission, said transmission shifting down at least one gear in response to said second control signal.

4. A hand control for a motor grader as recited in claim 1 further comprising a wheel lean cylinder connected to a pair of front tires, said wheel lean cylinder connected to one of said electro-hydraulic actuators and wherein movement of one of said switches in a first direction on one of said axes transmits a first control signal to said electro-hydraulic actuator connected to said wheel lean cylinder, said wheel lean cylinder increasing a lean angle of said front tires in response to said first control signal; and movement of said switch in a second direction opposite said first direction on said axis transmitting a second control signal to said electro-hydraulic actuator connected to said wheel lean cylinder, said wheel lean cylinder decreasing said lean angle of said front tires in response to said second control signal.

5. A hand control for a motor grader as recited in claim 1 further comprising a transmission having a neutral position, a forward position, and a reverse position, said transmission connected to one of said electro-hydraulic actuators and wherein one of said switches is movable between three positions;

movement of said switch to a first position transmitting a first control signal to said electro-hydraulic actuator connected to said transmission, said transmission shifting to said forward position in response to said first control signal;

movement of said switch to a second position transmitting a second control signal to said electro-hydraulic actuator connected to said transmission, said transmission shifting to said neutral position in response to said second control signal; and movement of said switch to a third position transmitting a third control signal to said electro-hydraulic actuator connected to said transmission, said transmission shifting to said reverse position in response to said third control signal.

6. A hand control for a motor grader as recited in claim 1 wherein movement of said joystick on said plurality of axes sends a plurality of electrical input signals to said electronic control computer, said electronic control computer transmitting a control signal to one of said plurality of electro-hydraulic actuators in response to each of said electrical input signals.

7. A hand control for a motor grader as recited in claim 6 further comprising a right steering cylinder and a left steering cylinder, said right and left steering cylinders each connected to a front tire and to at least one electro-hydraulic actuator wherein movement of said joystick in a first direction on one of said axes transmits a first control signal to said electro-hydraulic actuators connected to said right and left steering cylinders, said right and left steering cylinders rotating said front tires in a first direction in response to said first control signal; and movement of said joystick in a second direction opposite said first direction on said axis transmitting a second control signal to said electro-hydraulic actuators connected to said right and left steering cylinders, said right and left steering cylinders rotating said front tires in a second direction opposite said first direction in response to said second control signal.

8. A hand control for a motor grader as recited in claim 6 further comprising one of a right lift cylinder and a left lift cylinder, said right lift cylinder or said left lift cylinder connected to a blade and to at least one electro-hydraulic actuator wherein movement of said joystick in a first direction on one of said axes transmits a first control signal to said electro-hydraulic actuator connected to said right or left lift cylinder, said right or left lift cylinder raising said blade in response to said first control signal; and movement of said joystick in a second direction opposite said first direction on said axis transmitting a second control signal to said electro-hydraulic actuator connected to said right or left lift cylinder, said right or left lift cylinder lowering said blade in response to said second control signal.

* * * * *